United States Patent [19]

Miotto

[11] Patent Number: 6,038,814
[45] Date of Patent: Mar. 21, 2000

[54] POTTED PLANT CONTAINER PROVIDED WITH MEANS FOR THE SELF-REGULATED ADMINISTRATION OF LIQUID

[76] Inventor: Sergio Miotto, Vicolo Raffaello Sanzio, 17-31055 Quinto di Treviso-Treviso, Italy

[21] Appl. No.: 09/044,678

[22] Filed: Mar. 19, 1998

[30] Foreign Application Priority Data

Mar. 19, 1997 [IT] Italy ................................ TV97A0029

[51] Int. Cl.⁷ ................................................ A01G 25/00
[52] U.S. Cl. ........................................ 47/79; 47/80; 47/81
[58] Field of Search ...................... 47/79, 80, 81

[56] References Cited

U.S. PATENT DOCUMENTS

| | | | |
|---|---|---|---|
| D. 255,555 | 6/1980 | Smith | D11/152 |
| 1,108,334 | 8/1914 | Carr | 47/79 |
| 2,130,234 | 9/1938 | Haglund | 47/79 |
| 2,189,982 | 2/1940 | Haglund | 47/79 |
| 4,171,593 | 10/1979 | Bigglestone | 47/79 |
| 4,173,098 | 11/1979 | Smith | 47/80 |
| 4,184,287 | 1/1980 | Roth | 47/79 |
| 4,236,351 | 12/1980 | Smith | 47/79 |
| 4,344,251 | 8/1982 | Edling | 47/80 |
| 4,389,815 | 6/1983 | English et al. | 47/81 |
| 4,435,918 | 3/1984 | Shain | 47/79 |
| 4,527,354 | 7/1985 | Sellier | 47/81 |
| 4,553,352 | 11/1985 | Powell et al. | 47/71 |
| 4,663,884 | 5/1987 | Zeischegg et al. | 47/59 |
| 4,745,707 | 5/1988 | Newby | 47/79 |
| 4,829,709 | 5/1989 | Centafanti | 47/79 |
| 4,885,869 | 12/1989 | Kim | 47/66 |
| 5,058,319 | 10/1991 | Liao | 47/81 |
| 5,351,438 | 10/1994 | Wolverton et al. | 47/79 |
| 5,426,889 | 6/1995 | Buora | 47/79 |
| 5,430,972 | 7/1995 | Wianecki | 47/66 |
| 5,644,868 | 7/1997 | Lui | 47/81 |
| 5,647,170 | 7/1997 | Holtkamp, Jr. | 47/81 |
| 5,782,035 | 7/1998 | Locke et al. | 47/79 |

FOREIGN PATENT DOCUMENTS

| | | | |
|---|---|---|---|
| 478316 | 9/1976 | Australia . | |
| 538711 | 8/1984 | Australia . | |
| 0619940 | 10/1994 | European Pat. Off. . | |
| 2329193 | 5/1977 | France . | |
| 2648008 | 12/1990 | France | 47/79 |
| 1207695 | 12/1965 | Germany | 47/79 |
| 2345899 | 3/1975 | Germany | 47/79 |
| 2819871 | 11/1978 | Germany | 47/79 |
| 8900713 | 3/1989 | Germany . | |
| 474211 | 6/1969 | Switzerland . | |
| 499084 | 1/1939 | United Kingdom | 47/79 |

*Primary Examiner*—Michael J. Carone
*Assistant Examiner*—Fredrick T. French, III

[57] ABSTRACT

A container for cultivating and then displaying ornamental plants and flowers comprises an outer vessel essentially divided into two parts, namely a lower part for containing water and an upper part for receiving the soil and the plant roots, said parts being separated by a horizontal wall through which clay elements extend into said parts.

8 Claims, 2 Drawing Sheets

POTTED PLANT CONTAINER PROVIDED WITH MEANS FOR THE SELF-REGULATED ADMINISTRATION OF LIQUID

BACKGROUND OF THE INVENTION

The present invention relates to a potted plant container provided with means for the self-regulated administration of water and/or a liquid nutrient. Hereinafter, reference will be made only to water for simplicity.

The present invention finds particular but not exclusive application in the plant nursery sector and in the production of accessories therefor.

Flower pots are well known in the state of the art, existing in various sizes depending on the dimensions of the plant concerned.

Such pots can be constructed of different materials, depending on their final use. In this respect, they range from containers of pressed cardboard and moulded plastic, widely used in cultivation processes, to traditional flower pots of pressed and fired clay, which, because of their ornamental nature are intended mainly for the final consumer. Such containers can have various shapes, of which the most widespread is the classical upwardly-open inverted frusto-conical shape. All pots contain one or more holes in their base, for performing the function of draining the irrigation water. However they also feed the plant by allowing a certain water intake from the underlying region. This is particularly facilitated by the presence of a separate, generally plastic collection dish, of greater diameter than the base, located below the pot, to collect via the outlet hole, the excess water distributed over the soil contained in said pot.

Such arrangements have drawbacks both for the plant and flower producer, and for the final consumer, especially with regard to irrigation methods. As producers have to control an indefinite number of plants, they must be able to provide complex irrigation systems which take account of the various requirements of each type of plant, which has its own feed cycle. This involves a considerable investment, particularly in economical terms, which is often not within the ability of a single producer. Moreover, plant producers have always neglected the appearance of the container, even though there is a firm market requirement to be able to purchase a product already contained in a pot of pleasing appearance.

However there is no doubt that the problem of irrigation is the one most felt by the consumer. In this respect, he is obliged to water them periodically, an operation which requires both time and his regular presence. These requirements are incompatible with the habits of a modern family, which is very often absent from the home for long periods during holidays and other festivities.

Automatic irrigation systems are among those which are considered to have solved this problem. However, apart from their economical aspect, which in this case even though not dimensioned for professional use has a considerable effect, they require careful maintenance and are not widely accepted because of their limited use, which is mainly outside a closed environment. A second aspect is their rather complicated and not always optimum operation, together with the need for complex installation work.

Low-cost water administration devices are also known for individual application to each plant. They comprise an overturned vessel with its mouth driven into the ground, or dripping systems using capillaries. It is also known to insert clay blocks of high water accumulation into the soil. The water quantity is regulated by a mechanical or electro-mechanical device. From a practical viewpoint, these difficult systems reflect the real requirements of the plant.

Parallel with the production of terracotta pots is a large production of color decorated ceramic containers of pleasant appearance.

One purpose of these containers is to replace the aesthetically poor containers in which the plant was originally potted, which requires the consumer to perform the considerable work of transplanting or re-planting the plant into a more pleasant container, with all the ensuing risks, from possible harm to the plant, to breakage of the container.

A further purpose is to substantially hide the terracotta pot in order to enable the plant to be displayed. This is necessary particularly in the case of certain clay containers which are very often rough and covered with salts which give the pot a rather poor appearance. To overcome this, certain firms in this sector subject the pot to special treatment, but this method is not convenient because it prevents the necessary air exchange.

Finally, to embellish on the traditional terracotta flower pot without using a ceramic container, the consumer can now use an embossed paper cover which is available in the main colors. The purpose of this paper is merely to cover the perimeter of the pot surface, to hide the lime deposit and other unattractiveness. Although it is advantageous cost-wise, it has a very limited life, being frequently in contact with jets of water, causing it to lose its rigidity and coloration.

SUMMARY OF THE INVENTION

An object of the present invention is to obviate the aforesaid drawbacks.

The present container of the invention consists of an outer vessel cylindrical structure essentially divided into two parts, namely a lower part for containing water and an upper part for receiving the soil and the plant roots, said parts being separated by a horizontal separated disc. The separated disc is removably supported by an internal step within the structure. Clay elements are also provided, which pass through said separated disc and have their lower end immersed in the water and their upper end at least partly embedded in the soil.

The clay elements are preferably of tubular form. An effective plant irrigation system is obtained by virtue of the water, the water absorption being self-regulated in relation to the climatic and environmental conditions.

The only action required of the user is the occasional topping-up with water, the level of which can be observed through a window. Other advantages relate to the ability to use containers of particularly pleasant appearance, which can be directly supplied to the nursery without the need to re-pot the plant or use expedients for enriching the pot appearance.

BRIEF DESCRIPTION OF THE DRAWINGS

These and further advantages will be apparent from the detailed description of the preferred but non-limiting embodiment thereof given hereinafter with reference to the accompanying drawings wherein.

DETAILED DESCRIPTION OF THE INVENTION

Figure 1:
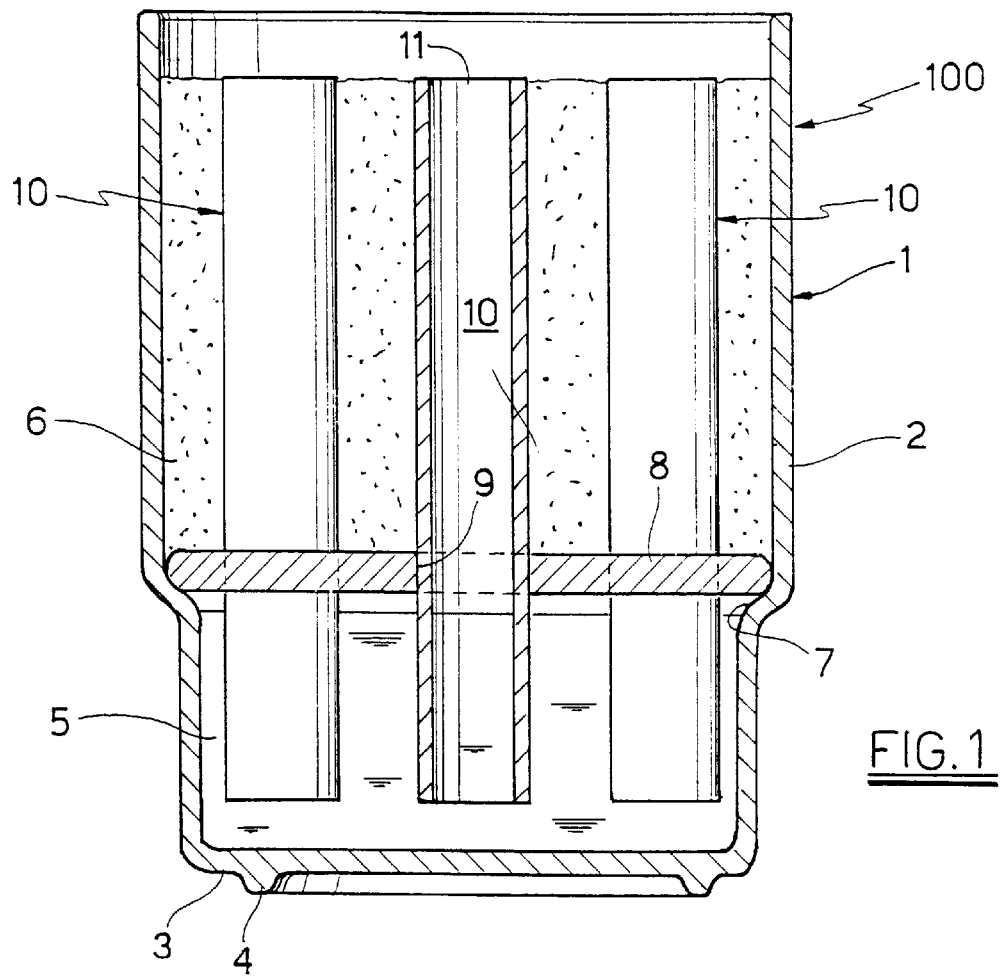
FIG. 1 is a section on the line J—J of FIG. 3.
Figure 3:
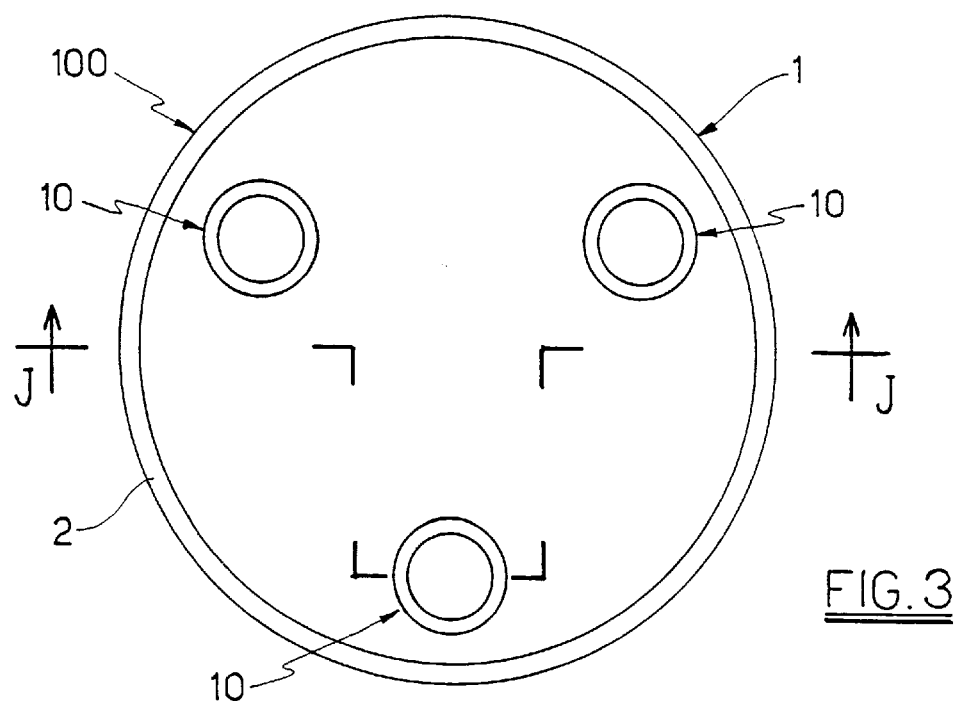
FIG. 3 is a plan view of the container of FIG. 1.

The figures show a container 100, consisting essentially of a cylindrical structure 1, the wall 2 of which extends to a certain height, and a base 3, integral with the structure is provided a circular support foot 4. The cylindrical structure 1 has two different diameters so as to define two parts, namely a lower part forming the lower part of water reservoir 5, and an upper part 6 forming the soil compartment. An annular step 7 is provided between the two parts.

Preferably the wall of the part 6 is opaque as it is intended to contain the plant roots, whereas at least a portion of the wall of the underlying lower part 5, which is to contain the water, is transparent to enable the water level to be read. Reference notches can be provided on the transparent portion of the wall to indicate the minimum and maximum available water level.

A round separator disc 8 preferably of fired clay construction simply rests and hence is supported on the annular step 7. In the disc 8 there is provided at least one hole 9, within which there is inserted a tube 10 or other equivalent means provided with considerable porosity. In the illustrated example there are provided three holes and three cylindrical tubes constructed of pressed or drawn clay which is then fired. The tubes 10 act as transferring oxygenators, their lower end portion below the disc 8, is immersed in the water contained in lower part 5, the upper portion above the separator disc 8, is partly buried in the soil in contact with the plant roots.

To occasionally top-off the lower part 5, the user can feed water through the communication holes provided by the tubes 10, via their upper mouth 11 which projects just above the soil surface. In a preferred embodiment the lower ends of each tube 10 is slightly spaced from the base 3.

Figure 2:
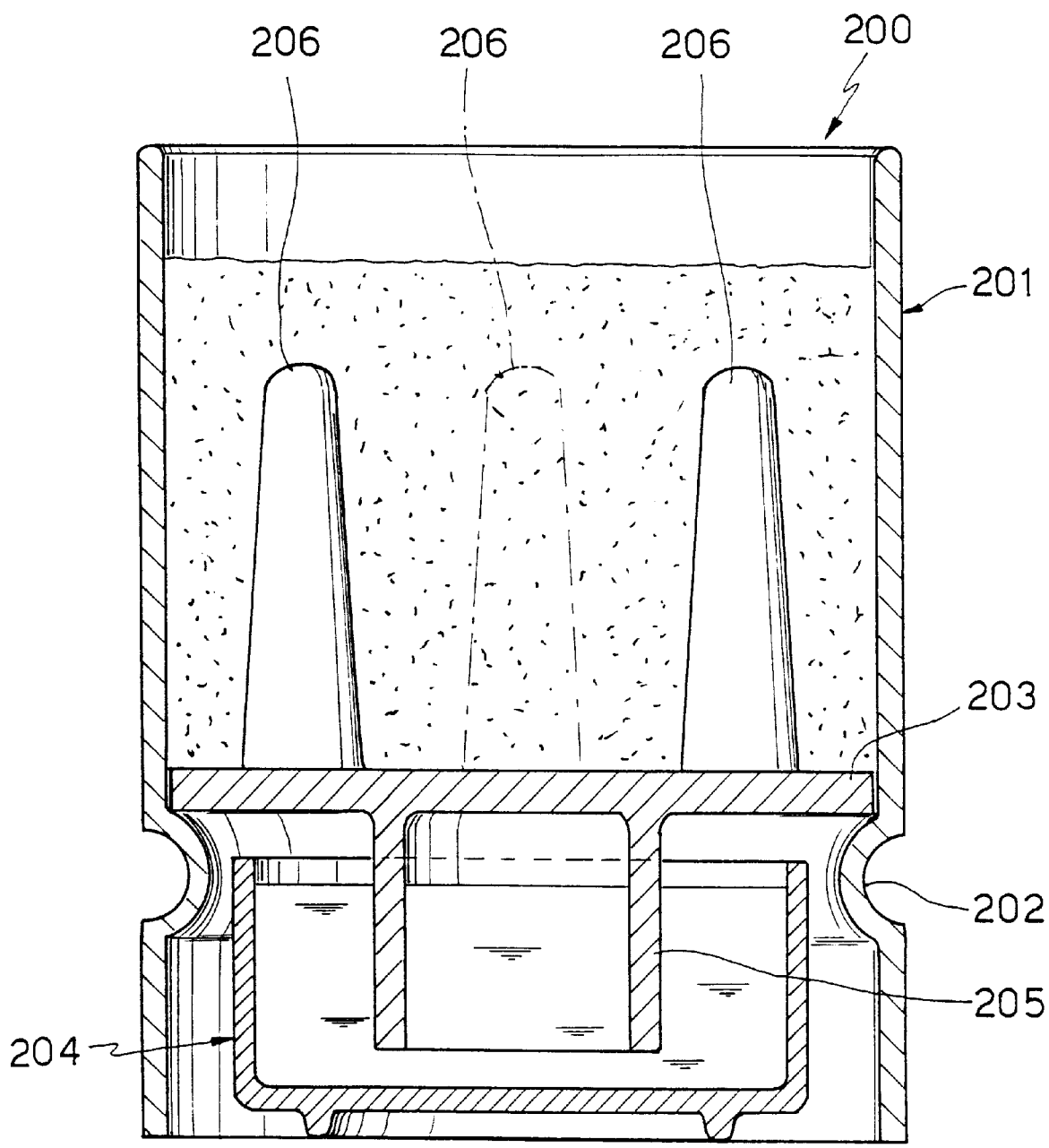
FIG. 2 is a longitudinal section through an alternative structure of the container of FIG. 1.

A possible modification is shown in FIG. 2. In this embodiment, the container 200 comprises an outer cylindrical structure 201 open on both sides, and provided with an annular recess 202 forming an annular support means for a separator disc 203. The base of the structure 201 consists of a container 204 inserted at the bottom of the structure, and which can be topped off in the traditional manner with water.

The disc 203 comprises a cylindrical lower appendix 205 to be immersed in the container 204 which, by virtue of the porosity of its material, enables the water particles to migrate upwards. On the upper side of the disc 203 there are at least two conical porous elements intended to remain completely embedded in the soil, and in contact with the plant roots. Again in this case, the material used in the construction of the disc 203, of the cylindrical lower appendix 205 and of the upper elements 206, is preferably clay which is pressed and then fired.

Finally the construction material of the outer cylindrical structure 201 or of the container 204 is independent of the material of the transferring means, so any material can be chosen. For example glazed and decorated ceramic, colored and pressed glass, stainless steel, wood, or moulded and decorated plastics of various kinds and of any shape can be used, provided the material has an ornamental value.

What is claimed is:

1. A potted plant container comprising an upper portion and a lower portion, said upper portion being separated from said lower portion by a porous separator disc, said upper portion being adapted to contain soil for a plant and the lower portion being adapted to contain water, and at least one porous, hollow tube extending through said porous separator disc from the lower portion to the upper portion for carrying water by capillary action from the lower portion to the porous separator disc and from the lower portion to said upper portion, said porous, hollow tube extending above the surface of the soil and providing a means for introducing water into said lower portion.

2. The potted plant container of claim 1, wherein the upper portion has a larger diameter than the lower portion, forming an annular step there between for supporting said porous separator disc.

3. The potted plant container of claim 1, wherein the lower portion is at least partially transparent for determining a liquid level.

4. The potted plant container of claim 1, wherein said porous tube extends above the bottom of the lower portion of the container.

5. The potted plant container of claim 1, wherein the porous tube is made of fired clay.

6. The potted plant container of claim 1 containing a plurality of porous tubes, only one of which is adapted to extend above the surface of the soil for supplying water thereto.

7. A potted plant container comprising an upper portion and a lower portion, said upper portion being separated from said lower portion by a porous separator disc, said upper portion being adapted to contain soil for a plant and the lower portion containing a separate container for housing water therein, and at least one porous, hollow tube extending through said porous separator disc from the lower portion to the upper portion for carrying water from the lower portion to the upper portion, said porous, hollow tube also providing a means for introducing water into said lower portion.

8. The potted plant container of claim 7 wherein the porous separator disc contains a porous lower appendix which extend into the separate container.

* * * * *